Jan. 25, 1955   R. C. LINDLEY   2,700,219
DENTAL PLATEN

Filed Aug. 6, 1951   2 Sheets-Sheet 1

INVENTOR.
Ross C. Lindley

Jan. 25, 1955 R. C. LINDLEY 2,700,219
DENTAL PLATEN
Filed Aug. 6, 1951 2 Sheets-Sheet 2
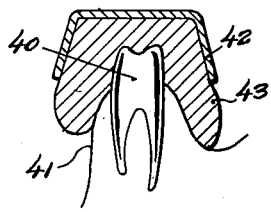
Fig. 5
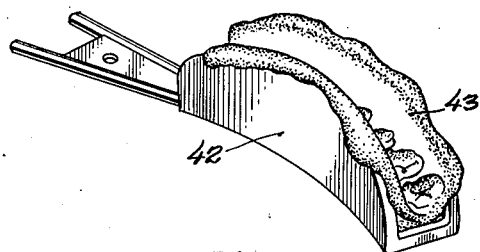
Fig. 6
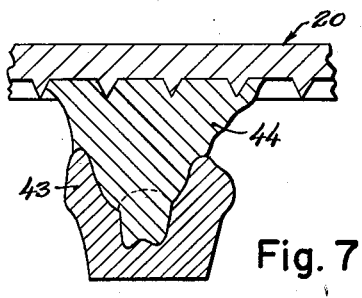
Fig. 7
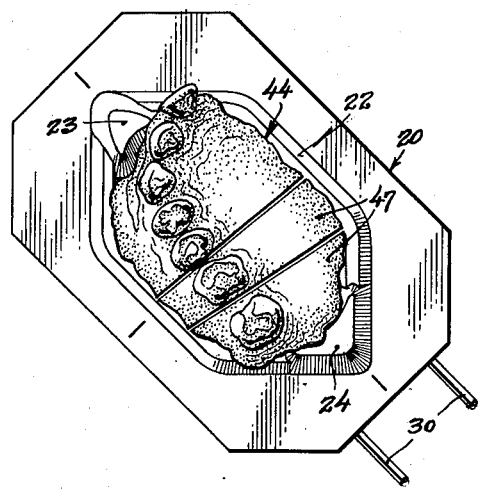
Fig. 10
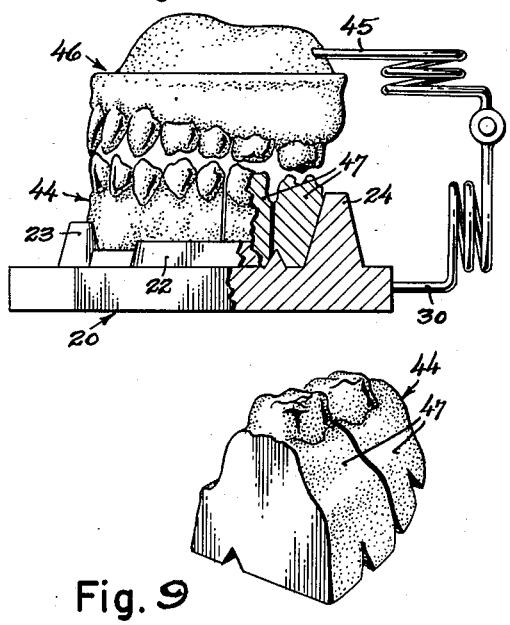
Fig. 11
Fig. 9
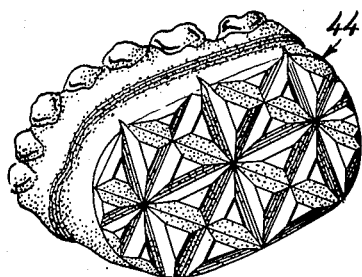
Fig. 8
INVENTOR.
Ross C. Lindley
BY Barnet + Seed
att'ys

United States Patent Office 2,700,219
Patented Jan. 25, 1955

2,700,219

DENTAL PLATEN

Ross C. Lindley, Seattle, Wash.

Application August 6, 1951, Serial No. 240,515

9 Claims. (Cl. 32—32)

This invention relates to the art of casting, and especially the casting of an object demanding painstaking attention to surface detail and in which a modeling material from which a forming matrix is to be produced is shaped upon a master pattern the surface configuration of which bears a necessary relationship to the surface detail which is to be worked into the model. Dentistry is a field to which the present invention peculiarly lends itself, particularly in the making of any repair or restoration piece such as a crown, inlay or the like.

Previous to the introduction of the present technique, where teeth are to be repaired or restored by fitting thereon a piece cast to a shape which will maintain proper bite relationship between opposing teeth, it has been the approved practice to make full upper and lower casts of the dental arches and upon these full casts shape a wax model of the repair or restoration piece which is to be made.

The advantage which is attained by the use of these full casts is that the presence of the patient is not required in order to determine contacts, occlusions, and marginal ridges. This is to say that the presence of the patient is required only to (1) prepare the cavity which is to receive the cast piece, (2) obtain impressions from which the full-arch casts are made, and (3) finally fit the cast piece in position. There has, however, been this objection to the use of full-arch casts, and that is the need for the dentist to handle a rather bulky object in making his study of the concerned tooth or teeth, readying the tooth for the shaping of the wax model of the repair or restoration piece which is to be made, and shaping this wax model upon the tooth.

Looking to the provision of a technique which would overcome this objection, I visualized that the answer was to separate from the full cast the particular tooth or teeth on which work was to be performed but I further perceived that in order for this to be done the tooth must be so constituted as to reassume the exact location which it originally occupied in the casting when such removable tooth is returned to the casting. This is self-evidently necessary in that disarrangement in even the minutest degree will change the relationship of the teeth from which the dentist interprets the bite.

The general object of the present invention is to provide a technique which will enable a cast object to be divided, freely separated, and the parts returned to position without in any way disturbing the relationship of parts which existed in the original casting, and this I accomplish by providing a platen having a mounting bed so formed that it will exactly localize any divided portion of an object cast thereon.

Other more particular objects and advantages will appear and be understood in the course of the following discription and claims, the invention consisting in the new technique and in the advanced form of a platen used in practicing said technique.

In the accompanying drawings:

Fig. 5 is a transverse vertical sectional view portraying the manner in which a tray containing hydrocolloid or other like or suitable impression material is employed by a dentist to obtain impressions of a patient's teeth as a step preliminary to his use of the present dental platen.

Fig. 6 is a perspective view showing the tray, with its contained body of impression material, after such impression is taken.

Fig. 7 is a transverse vertical sectional view illustrating the manner in which a body of plaster, while in a plastic state, is applied to the platen of the present invention and given profile shape by pressing the same, after the impressed hydrocolloid material has set, into the mold cavity of the latter.

Fig. 8 is an underside perspective view of the hardened body of plaster removed from the platen and from the impression tray.

Fig. 9 is a perspective view illustrating the manner in which the freed plaster replica of the teeth is separated, preferably by sawing, into one or more sections before being again returned to a position upon the platen for use as a sectional pattern.

Fig. 10 is a top plan view showing the sectional pattern in place upon the mounting platen; and Fig. 11 is a side elevational view, with parts broken away and shown in section, portraying the platen-carried sectional pattern in position upon one arm of an articulator the other arm of which carries a plaster replica of the particular teeth of the patient which are opposed to those reproduced in the sectional pattern.

Figure 1:
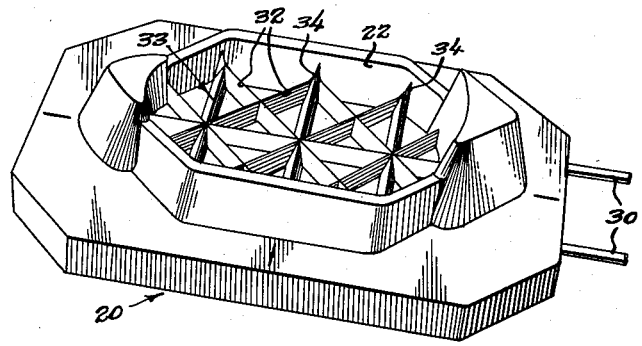
Figure 1 is a perspective view illustrating one form of a dental platen constructed in accordance with the teachings of the present invention, this form being such as would be used by a dentist where the repair or reconstruction work which he is called upon to perform requires a reproduction of only a segment of a patient's upper or lower jaw.
Figure 2:
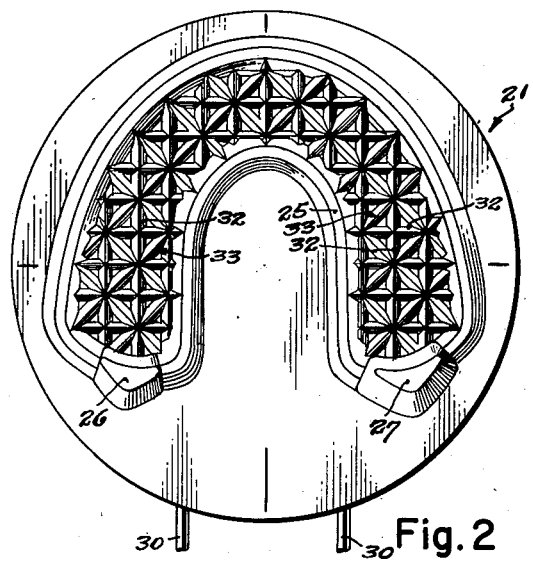
Fig. 2 is a perspective view illustrating a second form of platen which admits of having the full complement of a patient's upper or lower teeth reproduced thereon.
Figure 3:
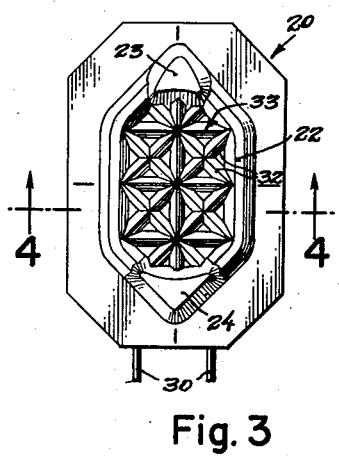
Fig. 3 is a top plan view of the embodiment of Fig. 1.
Figure 4:
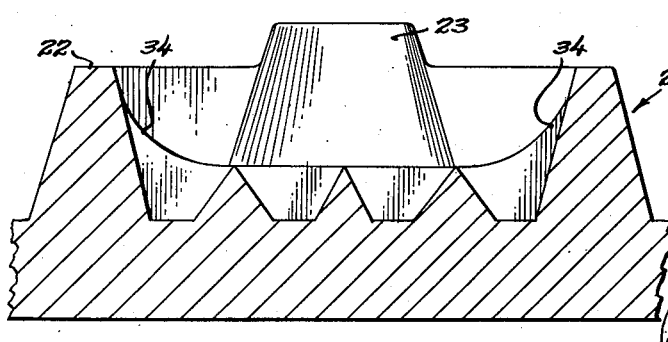
Fig. 4 is a transverse vertical sectional view drawn to an enlarged scale on line 4—4 of Fig. 3.

Referring to said drawings and for a particular description of my mounting platen first having attention to Figs. 1 through 4 inclusive, it will be seen that two forms are shown, one form 20 having a generally rectangular plan configuration and the other form 21 being circular in plan configuration. The form is unimportant other than as a particular type of work may be more conveniently performed by the use of a selected one of several different forms, and it is to be understood that the two forms shown are simply examples. Said platen 20 is intended to be used as the mounting base where the repair or restoration work which a dentist is called upon to perform concerns only one or more of a patient's teeth occurring upon a single side of a patient's upper or lower jaw. Where repair or restoration work is being performed upon both sides of a patient's upper or lower jaw the dentist uses the platen 21 as his mounting base.

The platens are produced from any suitable material, a hard thermosetting plastic by preference, and present upon their upper surface a fretted bed lying within the confines of an upstanding wall having its inner face moderately scarped so as to slope upwardly toward the crest. The figure outlined by the wall 22 of the smaller platen 20 is shown as having a generally rectangular shape narrowing to a blunt angle at the ends, and rising above the wall at such end is a surmounting post, as 23 and 24. One of these posts is desirably made somewhat more prominent than the other. As respects the larger platen 21, the figure outlined by the wall, here designated by 25, has the horseshoe shape of a full dental arch and as counterparts of the two posts 23 and 24 there is provided at each end limit of the arch a respective post promimence, as 26 and 27. In the practice of dentistry the two platens derive their greatest usefulness where the same are employed with a dental articulator to which they may be either permanently or removably attached. Illustrated in Fig. 11 is a type of articulator which conveniently lends itself to a permanent attachment as, for example, by embedding twin prongs 30 which constitute one of the two pivoted arms of said articulator directly in the material of which the platen is composed.

The provision, on the mounting face of my platen, of a fretted bed walled along the sides and with the walls rising by preference to a height well above the upper level of the fret-work, is considered the significant feature of my invention. Other than for the fact that each component of the embossing fret-work which is put into relief must have its facing sides sloped, thus to facilitate separation between the bed and an object molded thereon, the shape of these components is unimportant. It is, however, advantageous that the fret-work be given such a design that the impressions transferred to a molded body from the fret-work and from the walls bounding same will not be in exact conformity at any two longitudinally spaced points within the length of the fret-work. A fret-work design which is eminently suitable for my purpose is a recurring pattern in which saltires are set into voids of mascles, the crossed arms of the saltires being designated by 32 and the lozenge-defining legs of the mascles by 33. At the juncture between the fret-work and the side walls 22 or 25, as the case may be, and as can be best seen from an inspection of Fig. 4, the ridge of the concerned fret is desirably sloped so as to provide upswept shoulders 34 occurring at closely spaced intervals along the length of said side walls.

For purposes of example, let it be assumed that the platen is being employed by a dentist and assume further that the dentist is called upon to place gold inlays in one or more of the teeth contained in the lower arch of a patient's mouth. The dentist first prepares the concerned teeth by producing the cavities in which the inlays are to be set and then takes an impression of a segment of the lower arch including the teeth which are to be restored. The total number of teeth comprehended in the impression should be such as will enable the dentist to later analyze "jaw relation," a term well-known in the field of dentistry and the significance of which, in the present technique, will be clearly understood as the description proceeds. The manner of taking this impression is illustrated in Fig. 5 wherein the tooth and gum from which an impression is taken are designated by 40 and 41, respectively. It is customary, in making an impression, to employ a tray 42 coated with a fairly thick body 43 of soft hydrocolloid or other suitable impression material (see Fig. 6). Before removal from the mouth the impressed material is caused to set by circulating water around the same. The dentist also similarly obtains an impression of the patient's opposing teeth. The upper and lower impressions are removed to the laboratory and reverse replicas are cast therefrom, this operation being performed by mixing plaster stone and vibrating the same into the troughs of the impressed hydrocolloid bodies. The dentist now takes a platen of a size to meet the particular job, the platen 20 being selected for purposes of illustration, and coincident with the operation of applying wet plaster stone to the impressed trays he also vibrates onto the platen a sufficient quantity of the wet substance to completely cover the fretted portion thereof. The platen serves as a mounting base for the plaster replica which is a reproduction of the teeth on which restoration work is to be performed, in this instance the replica of the lower arch, and while the two plaster bodies, and namely that contained in the impression of the lower arch and that which is applied over the fret-work of the platen 20, are still soft they are brought together—fresh plaster against fresh plaster—and allowed to set as one. The platen desirably should be face-down toward the impression so that the weight of the plaster will be upon the impression and thus make the cast replica of the teeth as accurate as possible. This step is shown in Fig. 7 wherein the plaster-stone casting is denoted by 44. After about a 20- or 30-second hardening period, the entire assembly is placed for approximately thirty minutes in a bath of potassium sulphate so as to preclude dehydration. Upon removal from the bath the plaster replica is freed both from the platen 20 and from the impression body 43, this being easily accomplished by striking rather sharply with a spatula from below, and the plaster replica is then again fitted upon the fretted face of the platen, the impression body 43 being discarded in that the same is of no further use. At this stage of the process the two castings, and namely that which is a reproduction of the patient's upper arch and that which is a reproduction of the lower arch, are given "jaw relation" upon an articulator. Illustrated in Fig. 11, the upper arm 45 of the articulator is embedded in or otherwise attached to the upper-arch casting 46. As previously mentioned, the lower arm 30 of said articulator is made secure to the platen 20. The mounting of the castings upon the articulator is perforce such that the opposing teeth are in occlusion reproducing the relationship which exists in the patient's mouth. The dentist now removes the casting 44 from the platen 20, trims the casting, and separates the same into a plurality of divided sections 47. This dividing step is such as will isolate the portion or portions of the casting which contain the replica of the particular tooth or teeth on which work is to be performed, and it may be done by sawing or, if desired, by placing thin separator plates within the trough of the impression 43 before the soft plaster is introduced thereto. Where separator plates are employed they must perforce be so encased by the plaster as not to come into contact with the fret-work or the confining walls 22 of the platen when the step, portrayed in Fig. 7, of bringing the two bodies of fresh plaster together is performed. Castings containing separator plates are divided by subjecting the casting to a bending stress. I consider sawing to be a preferred procedure.

With the casting so separated into several divided sections, the latter are replaced in their proper position upon the platen and it will be apparent that each of these replaced sections becomes localized upon the platen in consequence of the fact that its underside is embossed in mating correspondence with the fret-work of the platen. Any liability of the sections rocking about a horizontal axis is precluded by the upswept shoulders 34 along side edges of the fret-work and by the two posts 23 and 24 at the ends of the fret-work.

From the foregoing it will be seen that there is provided a sectional replica of either a complete arch or a portion of such arch, as the case may be, and it will be apparent that these sections may be individually removed and replaced with ease without in any way disturbing the relationship which permits a patient's bite to be precisely interpreted.

Giving, for each tooth which is to be restored, an individual die capable of being removed and replaced at will from and to a master pattern including replicas of other adjacent teeth, and giving the necessary assurance that an exact relationship is maintained at all times between the removable tooth and the other teeth in the pattern, the dentist is enabled to better study the teeth and can perform, in the laboratory, detail work leading to an ultimate restoration of a patient's tooth or teeth with far greater accuracy and with considerable more ease and expedition than has been heretofore possible. It is thought that the invention will have been clearly understood from the foregoing detailed description of a mounting platen constructed in accordance with the now preferred embodiment of the invention, and of the technique practiced therewith. Operations in which work is to be performed upon both upper and lower teeth of a patient's jaw can of course utilize two of the present platens in conjunction, one to be mounted upon the upper arm and the other upon the lower arm of an articulator. I reiterate that my illustration of frets produced in a recurring design suggesting saltires (crosses) set into mascles (voided lozenges) is intended to exemplify one of many designs to which the fret-work might be advantageously patterned. The object in view is to localize the sections of the plaster casting by (1) orienting the same and (2) precluding the same from rocking about a transverse axis. The upswept shoulders and the end posts perform the latter office.

It will be apparent that a dentist, using the present technique, is enabled not only to reduce the chair time to a minimum but also saves an appreciable amount of technical time in the laboratory. The invention has wide usefulness and may, for example, be advantageously employed in cleft-pallet cases and for orthodontia work. These last-named operations perforce call for the use of the larger full-arch pallet 21. A dentist also self-evidently selects the full-arch pallet in those instances in which he is called upon to perform restoration work upon several teeth of which one or more of the concerned teeth are located at one side and one or more other said teeth are located at the other side of the patient's mouth.

The pallets present a smooth-faced lip extending outwardly beyond the mounting bed proper and this lip is provided upon its facing surface with centering lines placed so as to coincide with both the major and minor axes of the mounting bed. The function of these lines is to permit the impression to be properly located while making the "pour," and which is to say while performing the step shown in Fig. 7 wherein the impression piece 43, with fresh plaster therein, is integrated with the fresh plaster applied to the pallet 20 or 21, as the case may be. The dentist employs indelible pencil or the like to mark a median line upon the exposed back of the impression and in bringing the impression piece and the pallet together, with the interposed plaster between, the pencil mark is caused to coincide with the centering mark when looking down upon the back face of the impression piece.

While I have shown the pallets as having the hinged arm 30 of an articulator fixedly attached thereto this is by way of illustration only. Where the articulator with which a pallet is used has the pallet permanently attached thereto, the desirable procedure, for each size or shape of pallet, is then to produce the pallets in sets, two pallets to a set. Both pallets of each set present an identical mounting bed but only one of the two pallets is connected to the articulator. The procedure is then to employ the free pallet as a mounting bed on which to produce the plaster pattern. After the plaster has set and the facsmiles of the teeth are divided, the sections are then transferred to the other platen in the set, and namely to the platen which is connected to the articulator. Inasmuch as the mounting bed of this latter platen is identical with that upon which the plaster pattern was formed the several sections of the pattern are caused to precisely orient themselves upon the articulator-carried platen in exactly the same manner as they would orient themselves if they were to be returned to the platen on which the pattern was formed. This use of two platens in a matching set is called for only where the articulator has the platen permanently attached thereto, which would make the platen somewhat clumsy to handle. If the platen is removably associated with the articulator a single platen will suffice.

The invention admits to minor changes in the details of construction and it is my intention that the hereto annexed claims be given a scope commensurate with the broadest interpretation which the employed language fairly permits.

What I claim is:

1. In a preformed dental platen serving as a holder and correlator for parts of a cast of a dental arch on which dental work is to be performed, said platen presenting an elongated mounting bed formed with multiple elongated indicia, said indicia being distributed throughout the mounting bed in a design whereby any part of the length of the bed extending between the side walls contains portions of at least two indicium so that parts of a dental arch cast which has had its base patterned by the indicia and subsequently has been sub-divided along its length can be readily reassembled on the platen in their exact original relationship by reference to the patterns in their bases.

2. In a preformed dental platen serving as a holder and correlator for parts of a cast of a dental arch on which dental work is to be performed, said platen presenting an elongated embossed mounting bed having curved generally parallel side walls and multiple protuberances distributed throughout the mounting bed in a pattern whereby any part of the length of the bed extending between the side walls contains a portion of at least one protuberance so that parts of a dental arch cast which has had its base impressed by the protuberances and its sides shaped by the curved side walls, and subsequently has been sub-divided along its length, can be readily reassembled on the platen in their exact original relationship by reference to the side walls and the impressions in their bases, some of said protuberances extending from one to the other side wall and connecting with the side walls by upswept stabilizing shoulders.

3. In a preformed dental platen serving as a holder and correlator for parts of a cast of a dental arch on which dental work is to be performed, said platen presenting an elongated embossed mounting bed having side walls and multiple elongated protuberances distributed throughout the mounting bed in a reoccurring criss-cross pattern whereby any part of the length of the bed extending between the side walls contains portions of at least two protuberances so that parts of a dental arch cast which has had its base impressed by the protuberances and subsequently has been sub-divided along its length can be readily reassembled on the platen in their exact original relationship by reference to the side walls and the impressions in their bases.

4. In a preformed dental platen serving as a holder and correlator for parts of a cast of a dental arch on which dental work is to be performed, said platen presenting an embossed mounting bed having side walls and multiple elongated protuberances of constant height along the greater part of their length, said protuberances being distributed throughout the mounting bed in a pattern whereby any part of the length of the bed extending between the side walls contains portions of at least two protuberances so that parts of a dental arch cast which has had its base impressed by the protuberances and subsequently has been sub-divided along its length can be readily reassembled on the platen in their exact original relationship by reference to the side walls and the impressions in their bases.

5. In a preformed dental platen serving as a holder and correlator for parts of a cast of a dental arch on which dental work is to be performed, said platen presenting an embossed mounting bed having curved generally parallel side walls and multiple elongated protuberances of constant height along the greater part of their length, said protuberances being distributed throughout the mounting bed in a reoccurring criss-cross pattern whereby any part of the length of the bed extending between the side walls contains portions of at least two protuberances so that parts of a dental arch cast which has had its base impressed by the protuberances and its sides shaped by the curved side walls, and subsequently has been subdivided along its length, can be readily reassembled on the platen in their exact original relationship by reference to the side walls and the impressions in their bases.

6. A preformed dental platen serving as a holder and correlator for cast parts of a dental arch on which dental work is to be performed, said platen presenting an embossed mounting bed having multiple closely associated protuberances distributed throughout its areal extent with the latter being surrounded by side walls extending above the protuberances and end posts extending above said side walls, said protuberances, walls and posts being so formed as to permit a ready upward withdrawal of a dental arch cast mounted on the platen with its base impressed by the protuberances and its sides and ends shaped by the said side walls and end posts so that the cast can thereafter be sub-divided between teeth and the resulting parts of the cast be easily assembled on the platen in their exact original relationship and held against lateral or endwise displacements relative to the platen or one another.

7. The platen of claim 6 in which the mounting bed is curved in the manner of a dental arch and is correspondingly narrow.

8. Structure according to claim 1 wherein the indicia include webs which extend from one to the other side edge of the bed and connect by upswept shoulders with the side walls of the bed.

9. A preformed dental platen serving as a holder and correlator for cast parts of a dental arch on which dental work is to be performed, said platen presenting an embossed mounting bed having multiple closely associated protuberances distributed throughout its areal extent with the latter being surrounded by side walls and at least one end wall extending above the side walls, said protuberances and walls being formed as to permit a ready upward withdrawal of a dental arch cast mounted on the platen with its base impressed by the protuberances and shaped by the said walls so that the cast can thereafter be sub-divided between teeth and the resulting parts of the cast be easily assembled on the platen in their exact relationship and held against lateral or endwise displacements relative to the platen or one another.

References Cited in the file of this patent

UNITED STATES PATENTS

| 2,538,638 | Wilson | Jan. 16, 1951 |

FOREIGN PATENTS

| 328,571 | Great Britain | 1929 |
| 494,480 | Great Britain | Feb. 14, 1938 |

OTHER REFERENCES

Tylman & Peyton, "Acrylics and Other Dental Resins," pp. 389–390. (J. B. Lippincott Co., Philadelphia, 1946. Copy in Division 55.)